May 19, 1953

W. H. NOBLES ET AL 2,638,860

METHOD AND APPARATUS FOR FORMING CABINET SHELLS

Filed Jan. 15, 1947

Inventors:
Warren H. Nobles
and Arthur R. Wylie,
By Arthur R. Wylie
Attorney.

May 19, 1953      W. H. NOBLES ET AL      2,638,860
METHOD AND APPARATUS FOR FORMING CABINET SHELLS
Filed Jan. 15, 1947      11 Sheets-Sheet 9

Fig. 11

Inventors:
Warren H. Nobles
and Arthur R. Wylie,
By Arthur R. Wylie
Attorney.

May 19, 1953 W. H. NOBLES ET AL 2,638,860
METHOD AND APPARATUS FOR FORMING CABINET SHELLS
Filed Jan. 15, 1947 11 Sheets-Sheet 10

Inventors:
Warren H. Nobles
and Arthur R. Wylie,
By Arthur R. Wylie
Attorney.

May 19, 1953 W. H. NOBLES ET AL 2,638,860
METHOD AND APPARATUS FOR FORMING CABINET SHELLS
Filed Jan. 15, 1947 11 Sheets-Sheet 11

Inventors:
Warren H. Nobles
and Arthur R. Wylie,
By Arthur R. Wylie
Attorney.

Patented May 19, 1953

2,638,860

UNITED STATES PATENT OFFICE 2,638,860

METHOD AND APPARATUS FOR FORMING CABINET SHELLS

Warren H. Nobles, St. Paul, and Arthur R. Wylie, Minneapolis, Minn.

Application January 15, 1947, Serial No. 722,164

11 Claims. (Cl. 113—45)

This invention relates to sheet metal shells, and more particularly to drawing hollow shells for cabinets, refrigerators and the like.

An object of this invention is to provide a method of and means for forming such a shell from a U-shaped sheet metal blank, forming front and back stiles therein, with front and back top rails, trimming the same on all sides, and ejecting the shell thus formed ready for successive operations on the shell.

Another object is the provision of a method of and machine for performing this series of operations semi-automatically so as to completely form and trim the blank while in the machine.

Still another object is the provision of a blank, preferably U-shaped, which will readily lend itself to the drawing operations, particularly at the corners.

Another object is the provision of such a blank, which when sheared or trimmed along the edges will cause the long piece of "scrap" thus trimmed off to be divided into a number of short pieces which will readily fall through the machine into a hopper (not shown) where they can be collected for baling.

This and other objects as will hereinafter appear are accomplished by this invention, which is fully described in the following specification and shown in the accompanying drawings in which.

This is a continuation in part of the application of Warren H. Nobles, Serial No. 624,968, filed the 27th day of October, 1945 and now abandoned.

Figure 1:
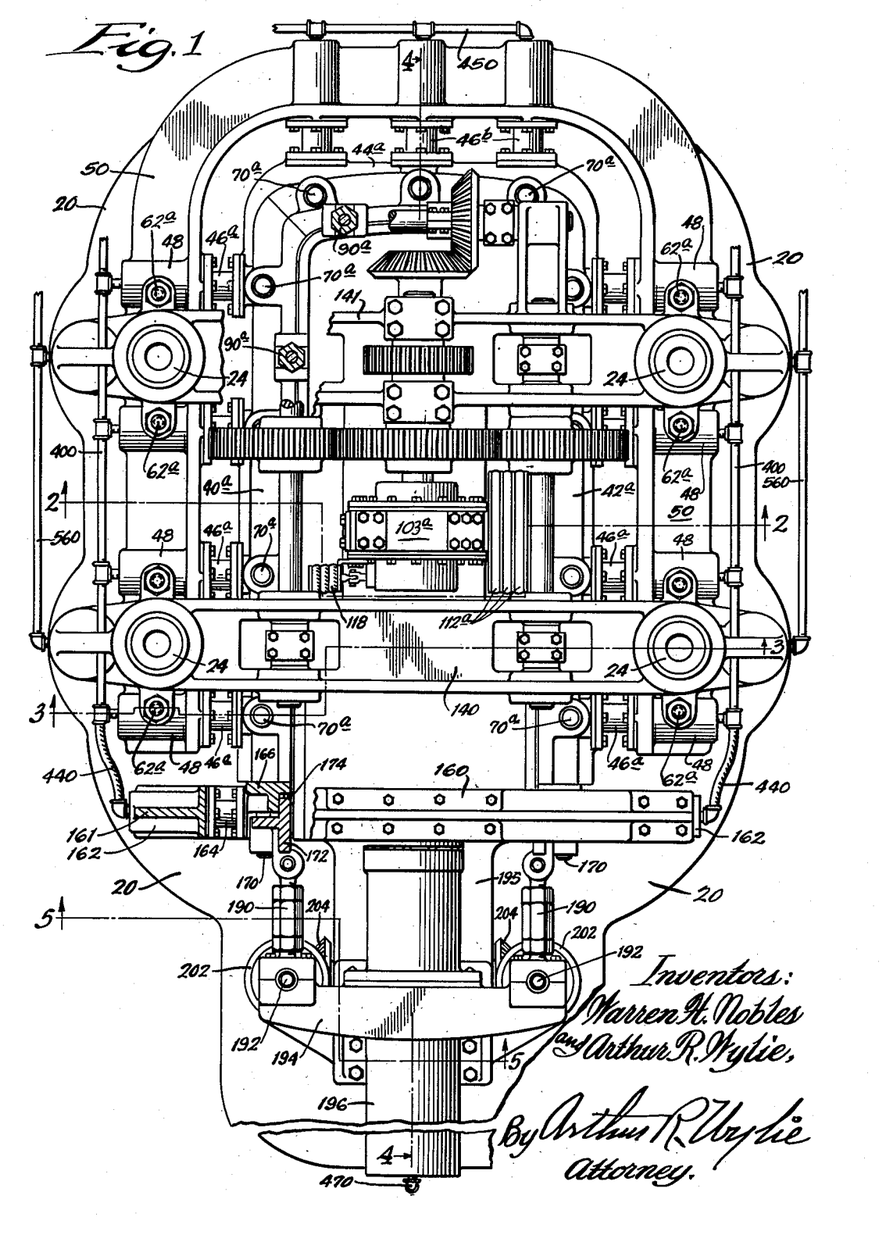
Figure 1 is a top plan view of a machine embodying the invention.

The embodiment illustrated comprises a machine having a main frame or base plate 20 as shown particularly in Figs. 1, 2, and 3 which is adapted to rest upon suitable concrete foundations 22 which preferably extend completely around the machine, leaving a hollow hopper-like space (not shown) beneath the center of the machine for a purpose which will hereinafter appear. Four parallel vertical posts 24 are firmly secured to this base casting and are accurately positioned therein so that they maintain a definite distance from each other at all points and which serve as vertical guides upon which other portions of the apparatus slide or are secured, as will later be described.

Figure 2:
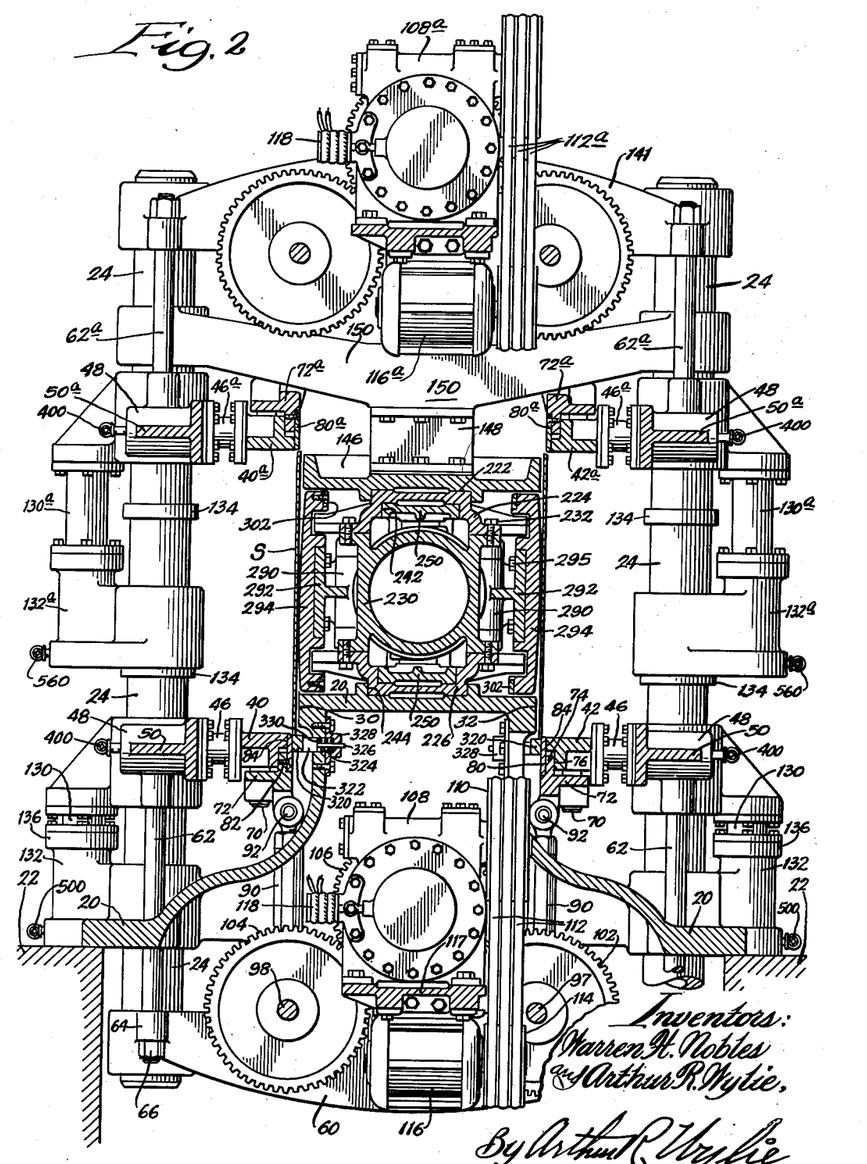
Fig. 2 is a vertical section on the line 2—2 of Fig. 1 showing the upper and lower draw rings open for the insertion of a blank which is U-shaped.
Figure 3:
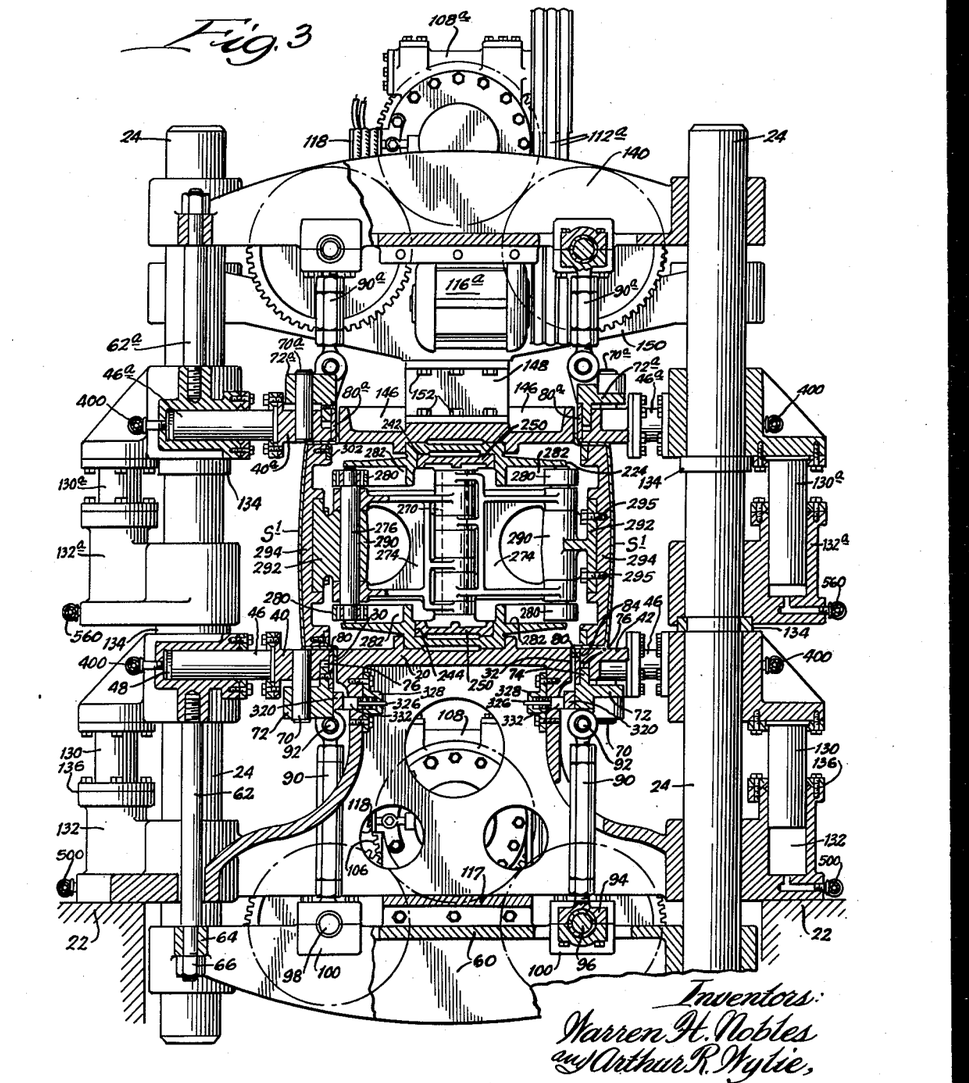
Fig. 3 is a vertical section on the line 3—3 of Fig. 1 with the outer draw rings closed and the expanders moved outwardly making the first draw.
Figure 7:
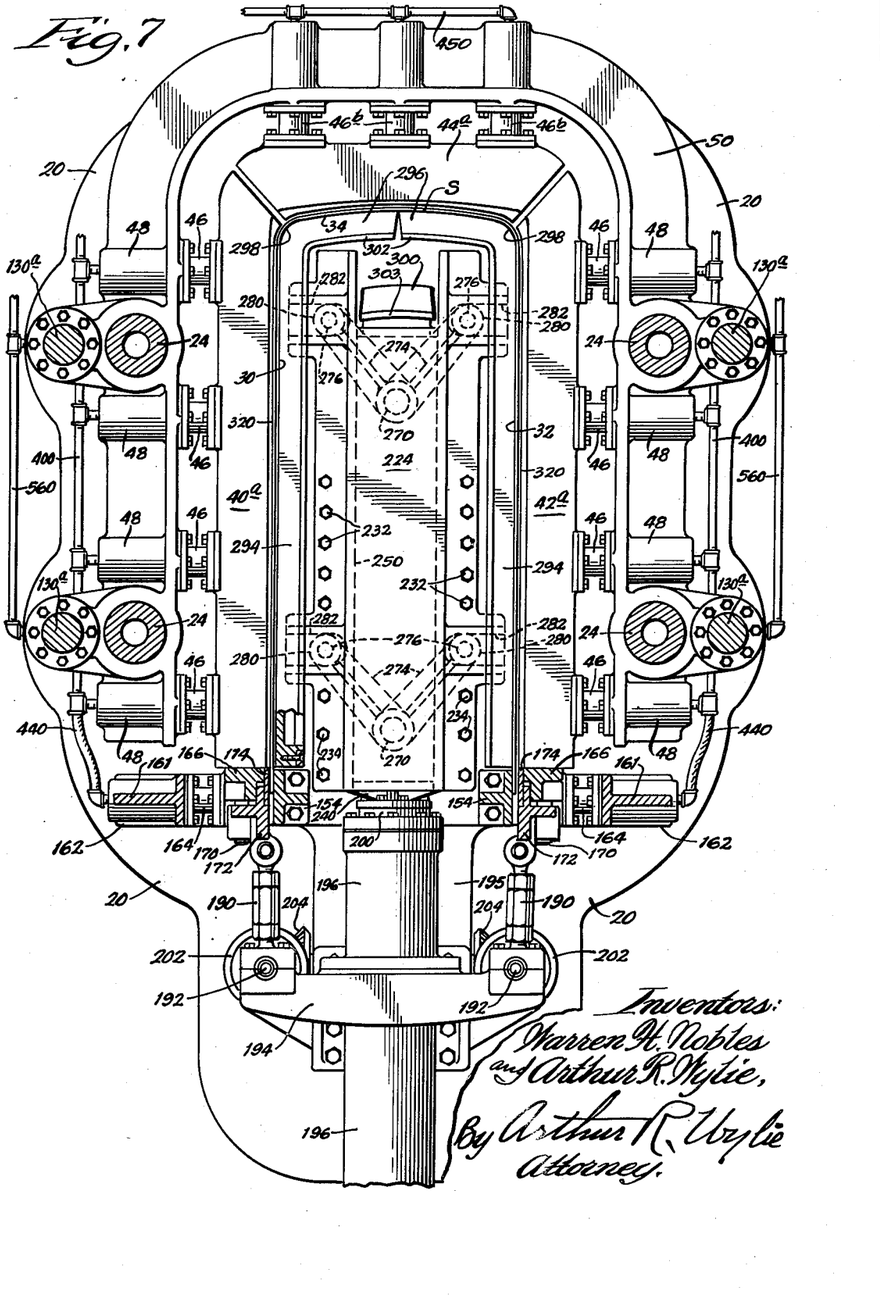
Fig. 7 is a partial horizontal section on the line 7—7 of Fig. 4 showing the U-shaped sheet S in place immediately after charging but with the outer draw rings open.

Referring to Figs. 3 and 7, it will be seen that the upper sides 30 and 32 and the front face 34 of the main frame form vertically disposed machined margins about which a sheet S (Fig. 2) may be gripped by means of side draw rings, or pressure plates, 40, 42 and an end draw ring 44 whose operation will presently be described. In this connection it will be observed that the upper outer draw rings are substantial duplicates of the lower outer draw rings, and that the term draw rings is hereinafter used for convenience in designating these parts. For this reason some of the same numerals have been used for both upper and lower draw rings with the suffix *a* added so that a description of one will substantially serve for the other.

The lower outer draw ring 40 is bolted to a series of pistons 46 which are tightly fitted into cylinders 48 in a U-shaped casting 50 which has a snug sliding fit on the posts 24. The casting 50 is spaced from a lower channel beam 60 by means of a series of side rods 62 preferably one on each side of each of the posts 24. The rods 62 being shouldered and threaded at each end, the upper end being screwed into a suitably threaded hole in the upper casting 50, while the lower end passes through a boss 64 on the beam 60 and is retained by means of a nut 66.

The lower outer draw rings 40, 42 are provided with tightly fitting vertically depending leader pins 70. Similar upper outer draw rings 40a, 42a are shown above in Figs. 2 and 3. The main frame 20 and inner draw ring 146 form part of the lower and upper inner draw rings. On the leader pins of each side is snugly fitted a shear beam 72 which has a straight portion 74 slidably fitting against a vertical shoulder 76 and carrying a shear blade 80 which is secured thereto by means of countersunk screws 82. This blade bears against a ledge 84 on the draw rings 40, 42 and terminates on the upper level of the draw ring with a slightly outwardly flaring curved surface which enables the sheet metal blank to be drawn around the rounded edge of this shear blade as will be seen by referring to Fig. 3. At the same time the shear blade is backed up by the shoulder 84 and by means of the hydraulic pistons 46, the metal is firmly gripped against the vertical faces 30, 32 of the inner draw ring.

The shear beams 72 are connected to an adjustable turnbuckle link 90 by means of a pin 92, the lower end of the turnbuckle terminating in the bearing 94 on an eccentric 96 (Fig. 3) of very slight eccentricity on a shaft 98 journaled in suitable bearings 100 on the channel beam 60.

Figure 4:
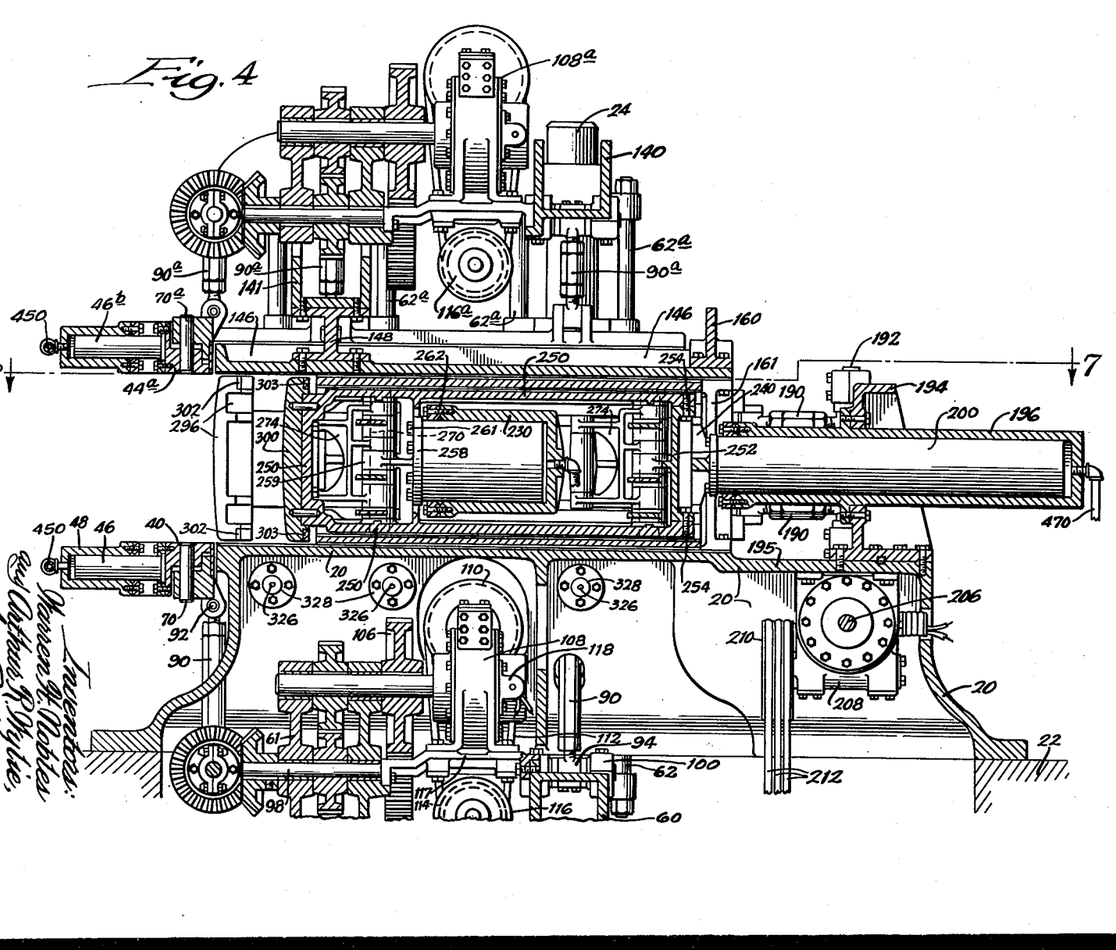
Fig. 4 is a vertical longitudinal section on the line 4—4 of Fig. 1 showing the outer draw rings closed.

Referring now to Figs. 2 and 4, the method of driving the shafts 97, 98 will be explained. These shafts have gears 102, 104 respectively keyed thereon which are of the same size and which mesh with a driving gear 106 keyed to a shaft (not shown) in a suitable reduction gearing 108 which has a worm shaft (not shown) driven by a heavy V-belt flywheel 110 which in turn is driven through V-belts 112 from a pulley 114 on a suitable electric motor 116. This motor and reduction gearing 108 are mounted on a bracket 117 bolted to the beams 60, 61 (Fig. 4).

This reduction gearing with a one-revolution clutch is well known in shears of this type and need not be described in detail. It is released by any suitable means such as a solenoid 118 from any suitable source of electric power. Its method of operation will later be described.

The method of raising or lowering the U-shaped casting 50 and the lower channel beam 60 on the posts 24 on which they are snugly slidable is accomplished by means of four pistons 130 in hydraulic cylinders 132, the upper limit of the movement of the casting 50 being set by suitable stops 134, one on each of the posts 24. The valve mechanism for doing this shown in Figs. 13 and 15 will later be described. It will be understood that in all these hydraulic cylinders there is a suitable packing gland as 136 for holding the desired pressure while permitting the movement of the piston.

The upper channel beams 140, 141 are slidable on the upper portions of the posts 24 and are similarly connected through side rods 62a with the top U-shaped member 50a. The hydraulically operated gripping mechanism is substantially a duplication of that described for the lower draw ring, so that its construction and operation will not be herein duplicated. This is particularly true of the shear blade, the shear beam and their mountings. In this case the shear blades 80a press from opposite sides against a solid inner draw ring 146, which is secured through a connecting member 148 to a header 150 being firmly secured to the two front posts, and thus firmly securing the inner draw ring 146 to these posts.

The rear end of the inner draw ring 146 and the main frame 20 are connected by means of standards 154 (Fig. 7) which are firmly bolted to both these members.

Referring again to Fig. 3, the top shear beams 72a are operated substantially like those previously described and shown at the bottom of Fig. 2, except that the links 90a at the top are shorter than the links 90 at the bottom. They are similarly driven through spur gears from a gear reducer 108a which is driven as before by an electric motor 116a through V-belts 112a.

The upper U-shaped casting 50a carrying the upper draw rings 40a and their associated parts are movable up and down by means of four pistons 130a operating in hydraulic cylinders 132a as will later be described in more detail.

Figure 8:
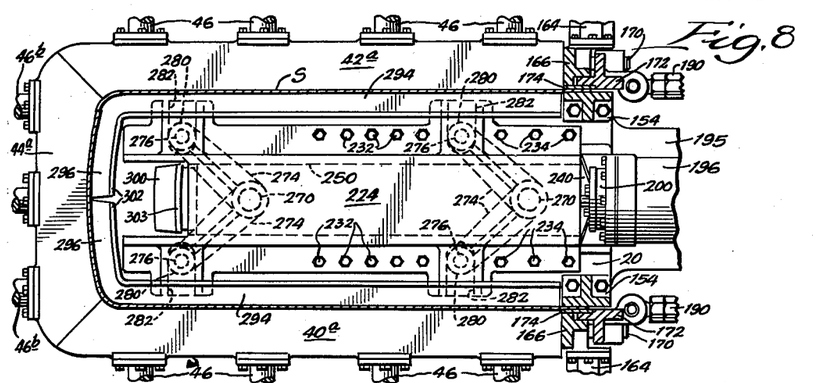
Fig. 8 is a partial similar view showing the outer draw rings closed and gripping the edges of the sheet metal blank.

The sheet to be drawn is first formed into a U-shaped blank S, which is shown in Figs. 2 and 7 assembled in the machine ready for the first draw. In addition to the side draw rings 40 and 42 is the top draw ring 44 and these are shown open in Fig. 7 and separated along a 45° angle and accurately fitted so that when brought together to grip the sheet there is no appreciable space between them. The top draw rings 44, 44a are moved toward and from the sheet S by means of pistons 46, 46b. Fig. 8 shows the side and top draw rings moved in to firmly grip the sheet S against the inner draw rings, as will later be explained more in detail. The top draw rings 44, 44a are pressed in first after which the side draw rings 40, 40a, 42 and 42a are pressed inwardly by their operating pistons.

The apparatus just described grips the upper and lower margins of the sheet. It is also necessary to grip the bottom ends of the sheet and that apparatus will now be described.

A ribbed yoke 160 (Figs. 4, 5 and 7) is bolted at the center to the rear end of the inner draw ring 146 and is also firmly bolted at its ends to vertical members 161 and these to brackets 163 which are bolted to the main frame 20, thus firmly tying the base 20 and the upper casting 146 whose sides and end form the upper inner draw ring. These vertical members 161 have two cylinders 162 at each side in each of which is slidable a piston 164. These pistons in turn are bolted to vertical bottom gripping members 166 which in turn carry rearwardly extending leader pins 170, on which are slidably fitted shear beams 172. These in turn carry shear blades 174 which are similar in their construction and operation to the shear blades 80 previously described. The shear beams with their shear blades are pressed inwardly by means of links 190 operating in the same manner as the links 90 previously described, namely by means of cranks not shown of low eccentricity on shafts 192 journaled in suitable bearings in a member 194. This member as shown in Fig. 4 is bolted to a ledge 195 on the rear end of the base 20 and is bolted to a long cylinder 196 in which operates a plunger 200 which serves to make the second or top draw and later to eject the finished cabinet shell and to return these parts to the position of Fig. 4 as will later be described. The shafts 192 (Fig. 7) have bevel gears 202 keyed thereon which mesh with similar bevel gears 204, the latter being keyed on a shaft 206 (Fig. 5) of a gear reducer 208 which in turn is driven by a V-belt flywheel 210 through a V-belt 212 which in turn is driven by an electric motor 214 similar to the electric motor 116.

The mechanism for making the first or side draws will now be described: Referring particularly to Figs. 2 and 4 the upper part of the base casting 20 and the lower part of the inner draw ring 146 are provided with machined ways 220 and 222 respectively. In these is longitudinally slidable a spider made up of upper and lower spider castings 224, 226 respectively secured to longitudinal flanges on a cylinder 230 by means of bolts 232 (Fig. 7). The rear end of the spider is secured by means of bolts 234 to cross arms 240 which are bolted on the front end of the plunger 200. Thus all the parts slidable between the ways 220 and 222 as shown in Fig. 2 may be considered as a carriage which can be propelled forward and back by means of the plunger 200 for purposes which will later appear.

Within the upper and lower spider members 224 and 226 are longitudinal guideways 242 and 244 respectively in which is slidable a U-shaped expander member 250 which is connected at the rear end by means of an end bar 252 (Fig. 4) secured by cap screws 254. The member 250 has an integral plate 258 cast therein which is secured to an expander piston 260, by means of cap screws 261, slidable in the hydraulic cylinder 230 and having a well known type of packing gland 262 secured at the outer end of the cylinder in a well known manner.

Center toggle shafts 270 (Figs. 3, 4 and 7) are secured at their outer ends to the expander member 250 and are supported at the middle by an integral bracket 259 carried by the plate 258. Toggle arms 274 which are preferably interchangeable are pivotally mounted on the shafts 270 and carry at their outer ends shafts 276 on the outer ends of which are mounted roller bearings 280 as shown in Fig. 3 which are adapted to roll in laterally extending guide ways 282 in the upper and lower spider castings 224 and 226 Intermediate the ends of the toggle arms 274, a bearing 290 is journalled about the shaft 276 and is made integral with a side plate 292 (Fig. 3) and this is fitted into an expander member 294 and secured thereto by means of bolts 295. The forward ends 296 of these members (Fig. 7) are curved toward each other with a relatively long radius at the corners 298, the two members being substantially identical except for the fact they are made right and left.

Figure 9:
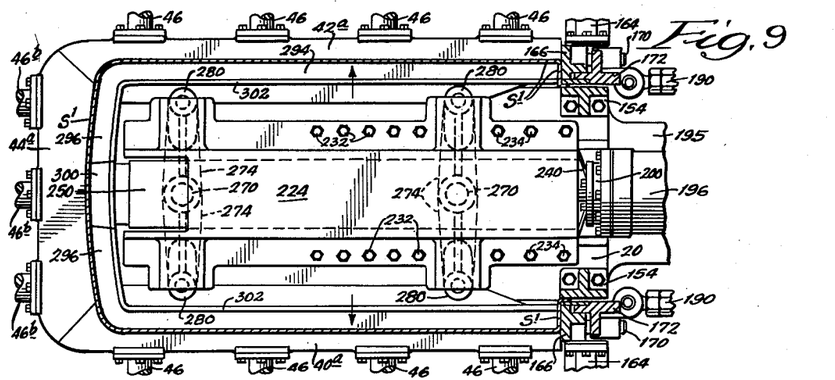
Fig. 9 is a similar view showing the toggles extended and the sheet expanded to make the first or side draw.

Starting with the parts shown in Fig. 8 in which the sheet S is gripped around the top, bottoms and sides between the shear blades backed up by the outer draw rings on the one side and the inner draw rings on the other. As the toggle piston 260 (Fig. 4) moves to the left it straightens out the toggle arms until they are in alignment as shown in Fig. 9, at which time the forward ends 296 of the inner draw rings have separated a considerable distance and a filler plug 300 which is bolted to the front end of the expander member 250 has moved forward and completely filled the space so that the front contour presents a substantially unbroken curved surface to the sheet $S^1$ as shown in Fig. 9. The first or side draw is now complete as shown in cross-section in Fig. 3.

An outer steel shear blade 302 is secured by countersunk screws to the surfaces of the expander members 294 and joins a shear blade 303 on the plug 300 and follows around the forward portions 296 and serves to cooperate with the shear blades 80, 80a etc., (Fig. 3) to shear off the outer portions of the sheet after the expansion has proceeded to a point where the several shear blades are in proper shearing position.

Figure 10:
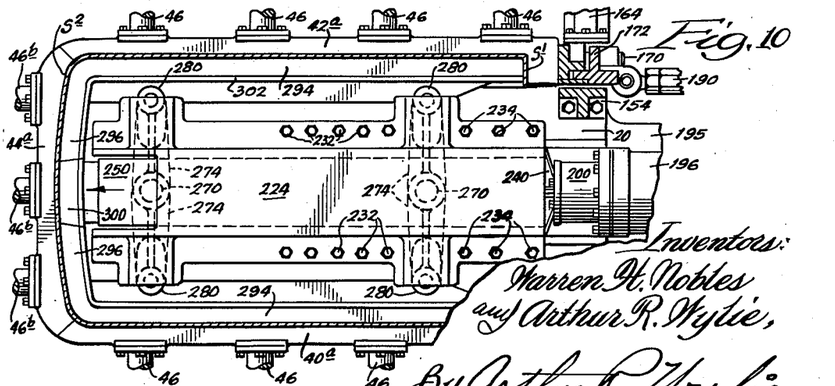
Fig. 10 is the same as Fig. 9 but showing the carriage moved forward to make the second or top draw in the first movement of the rear plunger.
Figure 11:
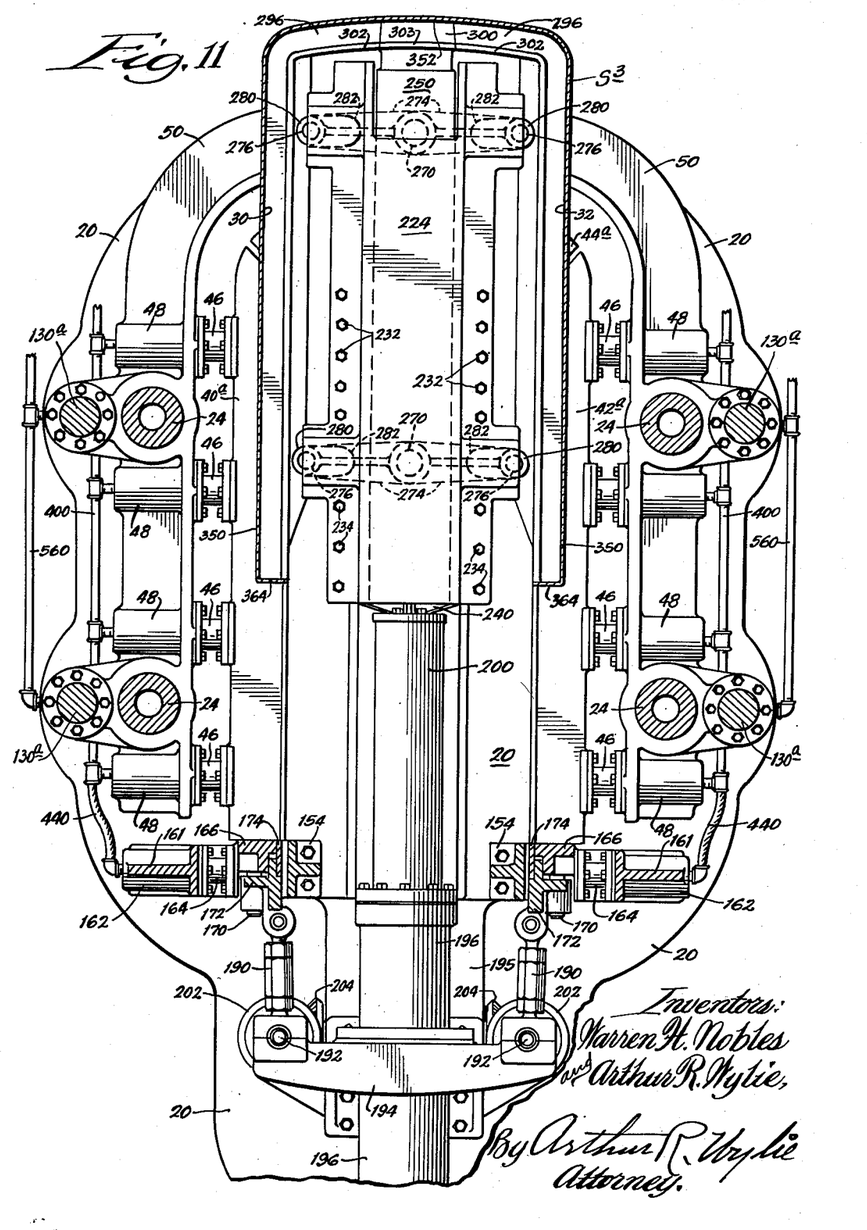
Fig. 11 is a view similar to Fig. 10 showing the carriage moved well out through the front end of the machine showing the second movement of the rear plunger.

Following the first draw as shown in Fig. 9 it is necessary to shear the metal at the bottom grippers 154, 166 (Fig. 7) so as to permit the partially finished cabinet shell to move endwise to the left to make the second or top drawn which is shown finished in Fig. 10. To make this shear the shaft of the gear reduction 208 (Fig. 5) is tripped to make one revolution which causes the rods 190 of Figs. 4 and 11 to advance the bottom shear blades 174 thereby trimming the bottoms of the sheet as shown in Fig. 10 thus releasing it and permitting it to advance with the carriage to make the second or top draw as shown in Fig. 11. To do this it is necessary to relax the grip of the side draw rings 40, 42, etc. somewhat to permit this longitudinal movement of the partially formed sheet $S^1$.

This second or top draw is accomplished as shown in Fig. 10 by advancing the entire carriage upon which the sheet $S^1$ after being trimmed at the bottom is advanced by the plunger 200. After this second draw a cross section of the sheet $S^2$ at the top would look substantially like a cross section of the sheet in Fig. 3. The sheet is now in condition to make the final trim since all of the shears of the sides and top, both front and back, of the cabinet are now lined up in shearing position. With the motors 116 driving the fly wheels 110 at high speed the operator actuates each of the solenoids 118 thereby releasing the main driving shaft of each for one revolution thereby completing the shearing of the cabinet and leaving it in the form shown in Fig. 14.

The completed cabinet shell $S^3$ is now located on the carriage following the trimming operation after the second or top draw. To release it the draw rings must first be opened as shown in Fig. 2 after which we prefer to advance the cabinet some distance through the machine as is shown in Fig. 11. This is done by advancing the plunger 200 so that the carriage with the cabinet and shell thereon slide out through the ways 220 and 222. The expander piston 260 is now withdrawn, which returns the toggle members to the angular position shown in Fig. 8 which causes the completed shell $S^3$ to drop after which the plunger 200 draws back into the cylinder 196 returning the parts to the initial position of Fig. 7, ready to repeat the above cycle of operations. The finished shell S³ is now deposited at the front end of the machine where it can readily be removed.

Figure 16:
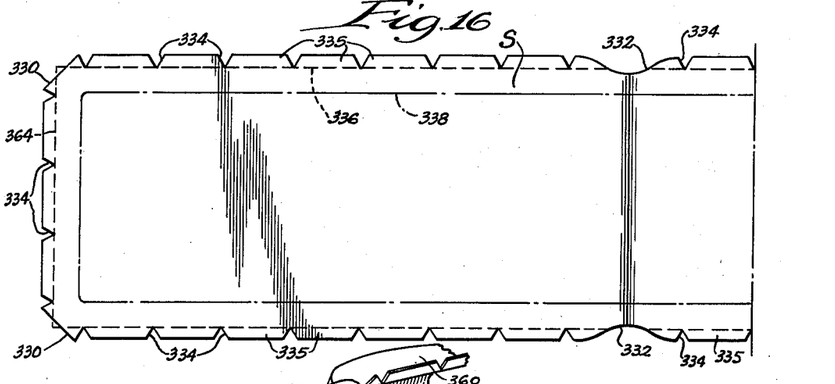
Fig. 16 is a partial view of a sheet metal blank before it is formed up into U-shape.

The flat sheet S or blank (Fig. 16) is relieved at the corners 330 and at the long bends 332 at the top ends of the sides and is provided at intermediate points with a series of notches 334 which are adapted to meet the ultimate lines of shear 336 so as to cause the scrap to fall into a number of small pieces 335. The line 338 represents the inner line of the area at which the shell is gripped between the inner and outer draw rings. The sheet draws less at the corners so that at the completion of the draw they assume the form of 331 and 333. This sheet is formed flat and is then bulldozed into the U-shaped section shown in Fig. 7.

A support for the sheet S particularly during its introduction into the machine comprises a bar 320 at each side which extends along nearly the entire straight length of the shear plate and slightly below its top and which is supported at intervals by a series of round pins 322 extending into round holes 324 in the side of the main frame. A shoulder screw 326 is slidably mounted in a bracket 328 which is bolted inside the main frame while a spring 330 presses the pin 322 and the bar 320 firmly against the shear blade 80.

The method of charging the bulldozed U-shaped metal blank S is as follows: With the draw rings open as shown in Fig. 2 the bottom corners of the blank are introduced alongside the main frame 20 and inside the shear blades 80 while they rest on the metal bars 320. The metal blank is then shoved back preferably by hand using the depression thus formed as a guide for the blank and this is continued until the top of the metal blank encounters the forward end of the inner draw ring 296 at which time the blank S will assume the position in Fig. 7.

Figure 12:
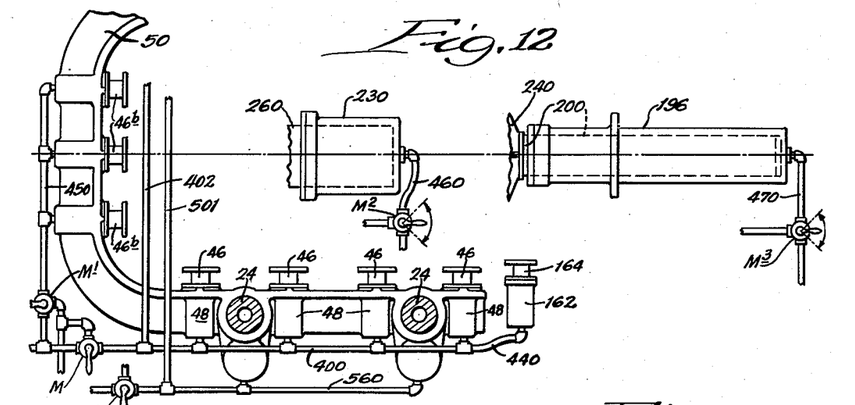
Fig. 12 is a diagrammatic partial plan view of the hydraulic system for making first and second draws, for ejecting the trimmed cabinet shell from the machine and for returning the several parts to their initial position ready for the reception of a new U-shaped sheet metal blank.

The apparatus for applying pressure to the draw rings to grip the edges of the sheet S shown principally in Figs. 12 and 14, the apparatus for raising the lower outer draw ring and lowering the upper outer draw ring from the positions shown in Fig. 2 to those shown in Fig. 3 which apparatus is largely shown in Figs. 13 and 15 will now be described.

Figure 13:
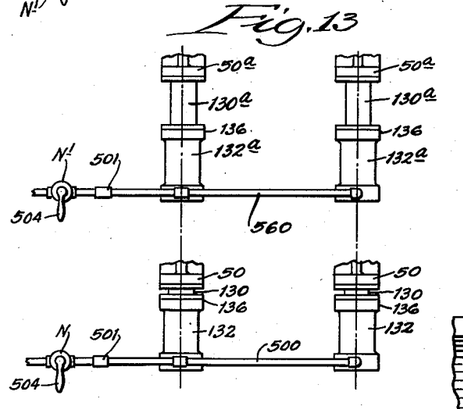
Fig. 13 is a diagrammatic side elevation of the machine showing the hydraulic system for raising and lowering the upper and lower draw rings.
Figure 14:
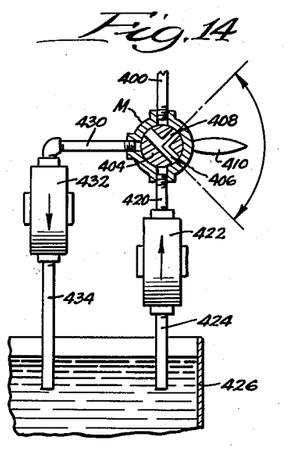
Figs. 14 and 15 are diagrammatic views showing valves for use in the systems of Figs. 12 and 13 together with the pressure and vacuum pumps and the drain to sump.
Figure 15:
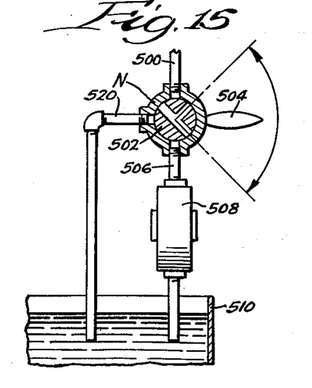

The U-shaped casting 50 (Fig. 12) is moveable up and down on the posts 24 by apparatus which is shown in Figs. 13 and 15 which will later be described. A series of pipes 400 communicate with the lateral cylinders 48 on one side while a pipe 402 communicates with the cylinders on the opposite side. Both pipes 400 and 402 are supplied with suitable hydraulic pressure through a valve M (Fig. 14) which has a plug 404 with a straight passage 406 and a passage 408 at right angles thereto and communicating therewith. A handle 410 serves to operate the plug of this valve with a movement of about 45° above and below its present position as indicated by the arrow. Opposite the pipe 400 is a pipe 420 connecting the valve to a pressure pump 422, the intake side of the pump being connected through a pipe 424 to a sump 426 or reservoir of oil or the like.

At right angle to the pipe 400, 420 is a pipe 430 which connects to a vacuum pump 432 with a return pipe 434 to the sump.

Thus it will be seen that with the pumps 422 and 432 in operation the operator can put the pipes 400, 402 under pressure by lowering the handle 410 so as to throw them into communication with the pressure pump 422. When this is done all the lateral pistons 46 move in, thereby gripping any sheet S between the shear blade and the fixed inner draw. At the same time pressure will also be applied through the flexible hose 440 to apply pressure through the cylinders 162 and pistons 164 to the vertical gripping members 166 (Fig. 7). Should the handle 410 however be moved up so as to throw the channels 404, 408 into communication with the pipes 430 and 400 the vacuum pump 432 would then withdraw fluid from the pipes 400, 402 thereby withdrawing the outer lateral draw rings and the end draw rings as indicated in Fig. 2. If this occurred after the sheets had been trimmed all the pieces of scrap as 335 would be released and would fall into the space under the machine.

A similar but separate valve M¹ (Fig. 12) supplies similar pressure and vacuum to the end pistons 48b through pipes 450. These two valves are both supplied by the same sources of pressure and vacuum as shown in Fig. 12. The upper draw ring 42a is similarly supplied with pressure and vacuum through the same valves M, M¹. In actual practice pressure will be applied to the end draw rings 44, 44a first by moving the lever of the valve M¹. This insures the metal blank S being properly seated at the top, after which pressure is applied to the sides and vertical ends of the sheet by means of the valve M.

With the sheet now gripped all around as shown in Fig. 8 pressure is applied to the lateral expander members by applying pressure to the piston 260 in the cylinder 230 (Fig. 12) through a pipe 460 from a valve M² similarly supplied with pressure and vacuum as was done in case of the valve M. With pressure thus applied the toggles 274 straighten out as has previously been described, until they assume the position as shown in Fig. 9. The piston 260 remains locked in this position until released as will later be described.

Figure 5:
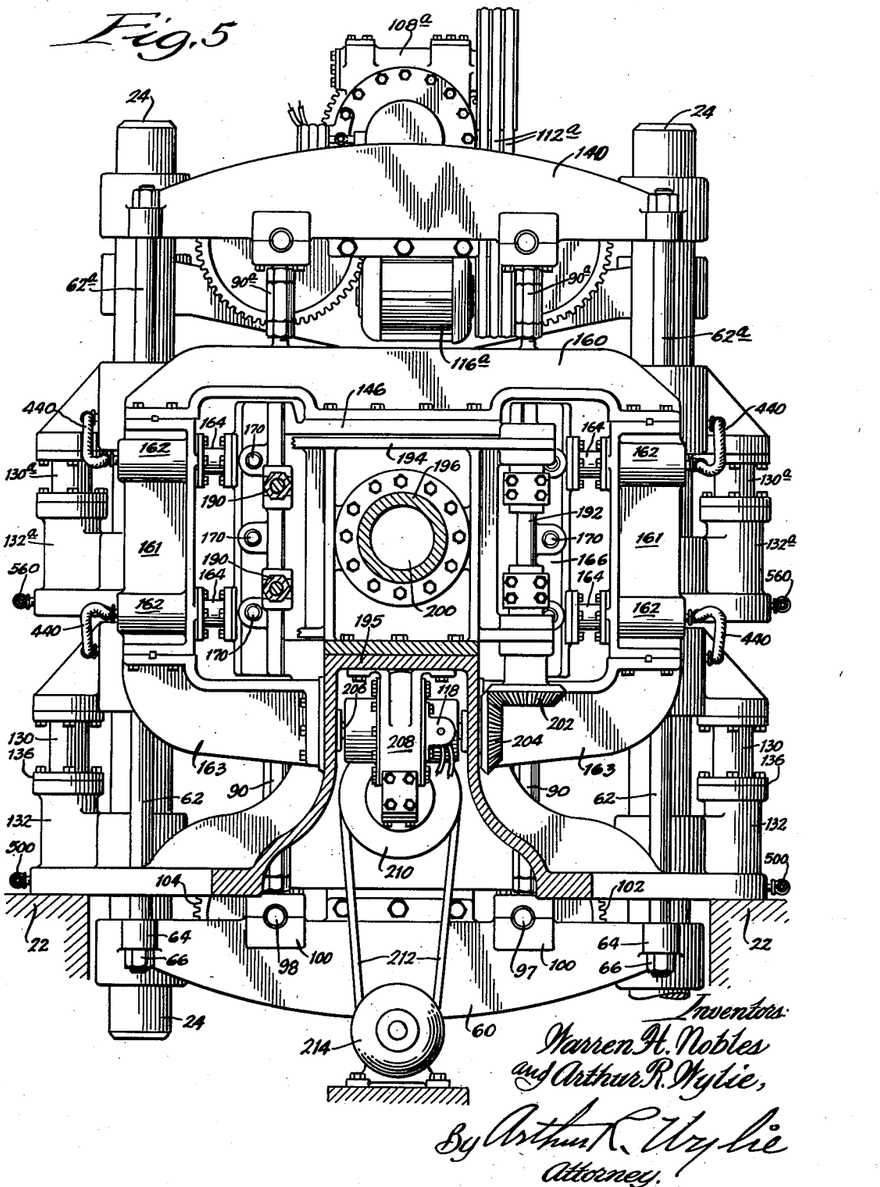
Fig. 5 is a partial vertical section on the line 5—5 of Fig. 1.
Figure 6:
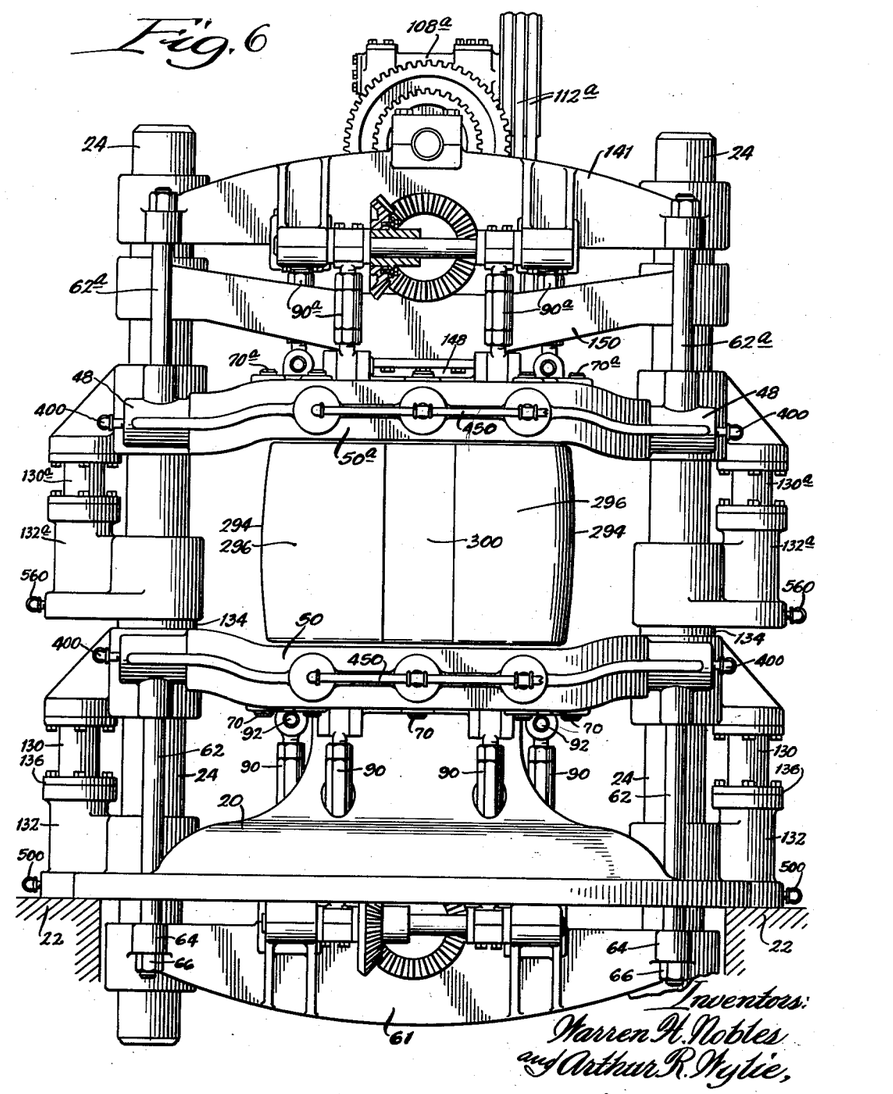
Fig. 6 is a front end elevation of the machine showing the outer draw rings closed.
Figures 17, 18, 19:
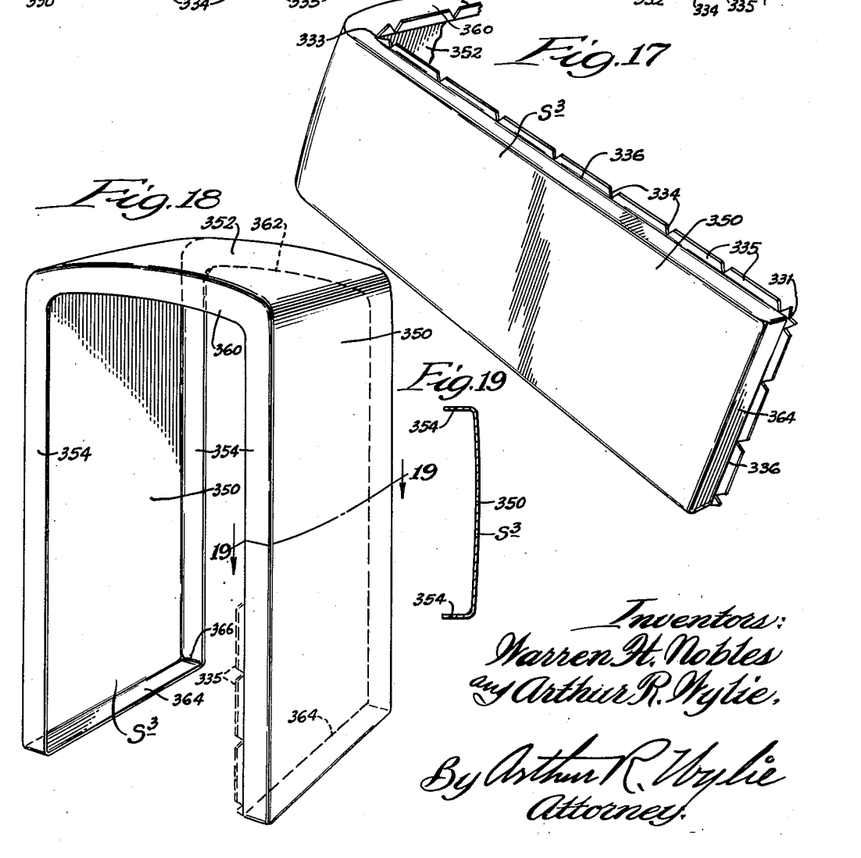
Fig. 17 is a partial perspective of a lower corner of the cabinet before shearing and after the first draw.
Fig. 18 is a perspective of a finished cabinet shell as it comes from the machine showing in dotted lines a part of the scrap prior to trimming.
Fig. 19 is a transverse section on the line 19—19 of Fig. 18.

It now becomes necessary to shear the scrap from the bottom of the cabinet as represented by the lines 364 of Fig. 18. This is done by releasing the clutch so as to drive the shaft 206 one revolution as shown in Fig. 5. This moves the shear beams 172 inward so as to cause them to shear the lower end of the sheet as has been previously described. The first or side drawing operation is now completed and we are ready to proceed with the second or top drawing operation which will now be described.

Pressure is now applied through pipe 470 to the end of the cylinder 196 through a valve M³ similar to the valve M and preferably connected to the same sources of pressure and vacuum. By applying pressure to this cylinder the carriage bearing the cabinet shell S¹ is moved forward from the position of Fig. 9 to that of Fig. 10 thereby effecting a drawing operation on the top of the shell similar to that which has just been performed on the side of the shell.

The parts are now in the position shown in Fig. 10 in which all the shear blades are in positions to complete the shearing operations. This can now be accomplished by actuating the solenoids 118, etc. thereby causing the shear operating shaft to make one revolution thereby operating each of the side and stop shears. This leaves the cabinet shell trimmed as shown in full lines as shown in Fig. 18 with a strong rigid transverse section as shown in Fig. 19 in which the sides are preferably somewhat arched with deep stiles 354 front and back with a top rail 360 which if desired may be even deeper.

This novel type of cabinet lends itself readily to future operations such as installing the bottom cross rail, piercing and flanging the door opening, installing back and bottom deck, etc.

While much of the apparatus as shown is left open for the sake of convenience, it will be understood it will be necessary to house it to protect it from the great number of small pieces of scrap 305 which can now be collected below and baled.

The mechanism for lowering and raising the outer draw rings will now be described: the cylinders 132 communicate with a valve H (Fig. 15) through a pipe 500. This valve has a rotatable plug 502 operated by a handle 504. This plug is similar to the plug 404 and has a connection 506 leading to a pressure pump 508 whose intake is in a sump 510. A side pipe 520 however is just a drain to the sump.

In operation, the valve M is turned to admit pressure to the cylinder to lift the lower outer draw ring 40 from the position of Fig. 2 to that of Fig. 3. Its upper limit is fixed by a stop as 134. To release and drop this draw ring the operator turns the valve handle up to enable the weight of this draw ring to force the oil or other liquid back to the sump through the pipe 520.

The upper draw ring 42a carried by the member 50a operates in just the reverse fashion. A valve N¹ similar to the valve N closes the draw ring 42a by draining off pressure from the four upper cylinders 132a through a pipe 560 and a drain pipe 520 which returns the operating liquid to the sump. To raise the pistons 130a, with the casting 50a and the upper draw ring 42a the operator turns the valve N¹ so that the pressure pump supplies pressure to the pipes 500, 501. This lifts them so that they assume the position shown in Fig. 2.

The term "bottom" as used in the specifications and claims refers to the bottom or base ends 364 (Fig. 18) upon which the finished shell stands when in use in a refrigerator. The term "top" refers to the top of the shell and top rails 360, 362 of the finished shell and top draw rings 44, 44a, etc., and, since the shell is formed on its side, the terms "upper" and "lower" refer to the upper and lower margins of the sheet S, as seen in Fig. 2 before forming or in Fig. 3 after the first forming operation and to the parts of the machine as the "upper draw rings," 146, 40a etc., and "lower draw rings," 20, 40 etc.

The cabinet shell thus formed may be seen in one form in Fig. 11 in which there are sides 350, a top 352, preferably arched, with front and back stiles 354, front and back top rails 360 and 362, and side supports 364. This cabinet is all formed integral and even the lower sharper corners as 366 are drawn to a small radius. The results are (1) a cabinet shell which is very strong and rigid, thereby effecting a saving in metal over existing types of assembled cabinet shells, (2) a great saving in time in trimming and handling because the shell is completely trimmed when ejected, (3) a further saving due to the depth of stiles and rails which greatly facilitate further operations, and (4) the flexibility permitted in cabinet style and design by substitution of other forms of expander members 294 and 300.

It will be apparent that this machine can be made more nearly automatic in its operation by adding solenoids to the handles of the valves M, N, etc. and connecting these solenoids and the solenoids 118, etc. to a suitable source of operating current through the medium of a slowly revolving controller so as to actuate the various gripping, drawing and shearing means in the order herein described and for returning the various parts to their original position ready to have a U-shaped blank S slid into place as shown in Fig. 2 ready for the next series of operations to form a shell.

The expander members 294 may readily be changed to make cabinets of various forms and shapes.

Thus it will be seen that we have provided a very simple and efficient method of and means for forming a complete cabinet shell from a sheet of metal in one continuous series of operations including trimming all the edges and ejecting the finished shell.

While we have shown and described only a few modifications of the invention, it will be understood that it is capable of many modifications. Changes therefore may be made in the construction and arrangement which do not depart from the spirit and scope of the appended claims.

We claim:

1. The method of making a sheet metal cabinet shell comprising providing a sheet metal blank and notching the marginal edges of the blank, forming the blank to U-shape, gripping the upper and lower margins and the bottoms of the sheet, and successively effecting the steps of expanding the sides of the sheet outwardly between said gripped margins by an expanding die to form pan-shaped cross-section with outwardly extending flanges, of shearing off the flanges at the bottoms of the sheet, of expanding the top end of the sheet outwardly by means of the expanding die in expanded condition to form a pan-shaped top cross-section continuous with the pan-shaped cross-sections in the sides with outwardly extending flanges, and of shearing off the flanges along the sides and top on lines at the inner ends of the notches so that the sheared flanges are divided and fall in short pieces.

2. The method of making a sheet metal cabinet shell comprising providing a sheet metal blank and notching the marginal edges of the blank, forming the blank to U-shape, gripping the upper and lower margins and the bottoms, of the sheet, and successively effecting the steps of expanding the sides of the sheet outwardly between said gripped margins by an expanding die to form pan-shaped cross-section with outwardly extending flanges, of shearing off the flanges at the bottoms of the sheet on lines at the inner ends of the notches, of expanding the top end of the sheet outwardly by means of the expanding die in expanded condition to form a pan-shaped top cross-section continuous with the pan-shaped cross-sections in the sides with outwardly extending flanges, and of shearing off the flanges along the sides and top on lines at the inner ends of the notches so that the sheared flanges are divided and fall in short pieces.

3. In a machine for drawing cabinet shells, inner and outer draw rings for gripping substantially the entire margins of a U-shaped sheet of steel, means including work engaging parts and a linkage for expanding said parts to draw the sheet outwardly between said draw rings to form a pan-like cross-section at the sides, means forming a part of the draw rings for shearing the two bottom margins of the sheet, means including the aforesaid linkage and the work engaging parts of the first named means for drawing the top of the sheet with the work engaging parts expanded to form a continuous hollow pan-like shell around the top and sides, and means forming part of the draw rings for shearing the remaining margins from the sheet.

4. The machine as claimed in claim 3 in which shear blades form the inner faces of the outer draw rings and have their inner edges rounded to permit the sheet to draw thereover.

5. The machine as claimed in claim 3 in which the outer draw rings are mounted to be horizontally slidable in U-shaped frames which in turn are vertically slidable on vertical posts which are firmly secured to the lower and upper inner draw rings, the inner draw rings and posts forming part of the main frame of the machine, means for raising and lowering the U-shaped frames, and means for moving the outer draw rings toward the inner draw rings to grip the margins of a sheet or to retract them to release the sheared margins.

6. The machine as claimed in claim 5 in which a plunger operates the work-engaging parts and linkage to draw the sheet outwardly to form the top of the shell, said plunger continuing to move the forming die and shell thereon partly outside the draw rings after the remaining margins have been sheared and after the outer draw rings are separated, and means for collapsing the forming die in the formed shell and for withdrawing the collapsed forming die within the draw rings leaving the formed and sheared shell partly outside the draw rings.

7. The machine as claimed in claim 6 in which the means for operating the various moving parts are hydraulically operated.

8. In a machine for drawing cabinet shells, inner and outer draw rings for gripping substantially the entire margins of a U-shaped sheet of steel, facing L-shaped expander members lying within the draw rings, spider members, toggle mechanism carried by the expander members and spider members and operable by movement of the spider members to force the expander members outwardly between the draw rings to draw the sheet outwardly between said draw rings to form side pan-like cross-sections of the shell, a plug carried on the top ends of the spider members, means to move the spider members to expand the expander members and to move the plug into the gap between the facing ends of the expander members as the latter are forced apart to form the side draws, means forming part of the outer draw rings for shearing the bottoms of the sheet, means to move the expander members, toggle mechanism, spider members and plug with the expander members expanded to force the sheet thereon between the top draw rings to form a top pan-like cross-section of the sheet continuous with the side cross-sections, and means including shear blades for shearing the side and top margins from the shell while they are still held by the draw rings.

9. The machine as claimed in claim 8 in which the outer draw rings are mounted to be horizontally slidable in U-shaped frames which in turn are vertically slidable on vertical posts which are firmly secured to the lower and upper inner draw rings, the inner draw rings and posts forming part of the main frame of the machine, means for raising and lowering the U-shaped frames, and means for moving the outer draw rings toward the inner draw rings to grip the margins of a sheet or to retract them to release the sheared margins.

10. The machine as claimed in claim 9 in which a plunger operates the work-engaging parts and linkage to draw the sheet outwardly to form the top of the shell, said plunger continuing to move the forming die and shell thereon partly outside the draw rings after the remaining margins have been sheared and after the outer draw rings are separated, and means for collapsing the forming die in the formed shell and for withdrawing the collapsed forming die within the draw rings leaving the formed and sheared shell partly outside the draw rings.

11. The machine as claimed in claim 10 in which the means for operating the various moving parts are hydraulically operated.

WARREN H. NOBLES.
ARTHUR R. WYLIE.

References Cited in the file of this patent

UNITED STATES PATENTS

| Number | Name | Date |
|---|---|---|
| 588,436 | Rust | Aug. 17, 1897 |
| 1,035,984 | Malde | Aug. 20, 1912 |
| 1,180,738 | Rehbein | Apr. 25, 1916 |
| 1,207,326 | Rehbein | Dec. 5, 1916 |
| 1,259,573 | Williams | Mar. 19, 1918 |
| 1,306,166 | Bickley | June 10, 1919 |
| 1,329,969 | Harrison | Feb. 3, 1920 |